(12) United States Patent  
Duan et al.

(10) Patent No.: US 10,790,623 B2  
(45) Date of Patent: Sep. 29, 2020

(54) SAFE CHARGING INTERFACE

(71) Applicant: INTERNATIONAL BUSINESS MACHINES CORPORATION, Armonk, NY (US)

(72) Inventors: Ning Duan, Beijing (CN); Peng Gao, Beijing (CN); Chun Yang Ma, Beijing (CN); Zhi Hu Wang, Beijing (CN); Ren Jie Yao, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 15/821,712

(22) Filed: Nov. 22, 2017

(65) Prior Publication Data

US 2019/0157816 A1 May 23, 2019

(51) Int. Cl.

| | |
|---|---|
| *G06F 21/60* | (2013.01) |
| *H01R 13/719* | (2011.01) |
| *H01R 24/64* | (2011.01) |
| *H01R 29/00* | (2006.01) |
| *G06F 21/31* | (2013.01) |
| *G06F 21/85* | (2013.01) |
| *H02J 7/00* | (2006.01) |
| *H02J 7/34* | (2006.01) |
| *H03H 11/04* | (2006.01) |
| *H01R 107/00* | (2006.01) |
| *H03H 7/01* | (2006.01) |

(52) U.S. Cl.  
CPC .......... *H01R 13/719* (2013.01); *G06F 21/31* (2013.01); *G06F 21/85* (2013.01); *H01R 24/64* (2013.01); *H01R 29/00* (2013.01); *H02J 7/00* (2013.01); *H02J 7/342* (2020.01); *H01R 2107/00* (2013.01); *H02J 7/00045* (2020.01); *H02J 2207/30* (2020.01); *H03H 7/01* (2013.01); *H03H 11/04* (2013.01)

(58) Field of Classification Search  
CPC ....................................................... G06F 21/60  
See application file for complete search history.

(56) References Cited

U.S. PATENT DOCUMENTS

| | | | |
|---|---|---|---|
| 5,606,315 A | * 2/1997 | Gaskins | .................. G06F 21/31 |
| | | | 324/378 |
| 8,560,864 B2 | 10/2013 | Chang et al. | |
| 9,026,347 B2 | 5/2015 | Gadh et al. | |
| 2005/0093645 A1 | * 5/2005 | Watanabe | .............. H03H 7/383 |
| | | | 333/101 |

(Continued)

OTHER PUBLICATIONS

LM Engineering Designs LLC, "LockedUSB Adapter—USB Charger Firewall & Power Optimizer," Kickstarter.pdf, Jul. 27, 2017, pp. 1-16.

*Primary Examiner* — Izunna Okeke  
(74) *Attorney, Agent, or Firm* — Intelletek Law Group, PLLC; Gabriel Daniel, Esq.

(57) ABSTRACT

An interconnection unit includes a first connector configured to be coupled to an electronic device. There is a second connector configured to be coupled to a power station and to provide a path to the electronic device via the first connector. There is a low pass filter coupled between the first connector and the second connector and configured to allow the electronic device to receive power from the power station while maintaining data security of the electronic device.

19 Claims, 7 Drawing Sheets

(56) References Cited

U.S. PATENT DOCUMENTS

2006/0035618 A1* 2/2006 Pleasant ............... H04B 1/0096
455/323
2015/0126070 A1 5/2015 Candelore
2015/0333545 A1* 11/2015 Luce ..................... H02J 7/0052
320/137

* cited by examiner

FIG. 7

SAFE CHARGING INTERFACE

BACKGROUND

Technical Field

The present disclosure generally relates to charging interfaces, and more particularly, to charging interfaces for smart electronic devices.

Description of the Related Art

In recent years, portable electronic devices have become ubiquitous. Today, electronic devices typically take the form of portable handsets, smart-phones, tablet computers, personal digital assistants (PDAs), and smart watches, although they may be implemented in other form factors, including consumer, and business electronic devices, and Internet of Thing (IoT) devices, as well as plug-in vehicles, collectively referred to herein as electronic devices (EDs).

To assure functionality of these electronic devices, a source of power is provided to either recharge the batteries and/or to continue the use of the electronic devices. A charging interface is typically coupled with a digital data communication interface to provide a multifunctional interface. When a trusted power source is used (e.g., in a home environment) there is typically little risk to compromising any data stored in the electronic device. However, electronic devices are increasingly often plugged in to power outlets and charging devices, collectively referred to herein as power stations. For example, a user may plug in their cell phone into a power station at an airport, train, café, etc., without realizing the potential risk that they are exposing the data on their electronic device to.

SUMMARY

According to one embodiment, an interconnection unit is provided that includes a first connector configured to be coupled to an electronic device. There is a second connector configured to be coupled to a power station and to provide a path to the electronic device via the first connector. There is a low pass filter coupled between the first connector and the second connector and configured to allow the electronic device to receive power from the power station while maintaining data security of the electronic device.

According to one embodiment, an electronic device is provided that includes a connector configured to be coupled to a power station. The electronic device includes a low pass filter that is coupled to the connector and is configured to allow the electronic device to receive power from the power station while maintaining data security of the electronic device.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure relates to systems and methods of safely charging electronic devices without compromising the data stored therein. Today, electronic devices may be frequently connected to a power source. Users rarely think about the potential dangers of plugging their devices into an unknown power station. For instance, malware may be installed on an electronic device, such as a cell phone, while the device is plugged into a power station. Malware is software designed to disrupt the operation of an electronic device. Malware includes viruses, worms, spyware, Trojans, adware, botnets, spambots, keyloggers, etc. For example, a Trojan is a malicious program hidden within a legitimate application. When activated, a Trojan allows criminals to gain unauthorized access to a user's electronic device. A botnet is a collection of malware affected devices, ranging in size from a dozen to tens of thousands that can be coordinated by a central server. A botnet can be used in spam, identity theft, or distributed denial of service (DOS) attacks. A spambot is an automated program that harvests personal contact information to send unsolicited email, short message service (SMS) or social media messages. A spambot may even decipher passwords and send its messages directly from a user's account. A keylogger captures passwords, usernames, bank account information, and credit card numbers typed into a computing device to later transmit the information back to the malicious party.

In some scenarios, electronic devices include passwords, to restrict access to the electronic device as well as safety precautions written into the software or firmware. The passwords and precautions are not guaranteed to prevent malware, since a hacker can often exploit vulnerabilities in poorly designed software or firmware running on the device to bypass its security. Once loaded, malware, among other things, might access the electronic device's data which may include personal information such as credit card numbers and bank account numbers, personal contacts, or personal pictures and videos.

Figure 1A:
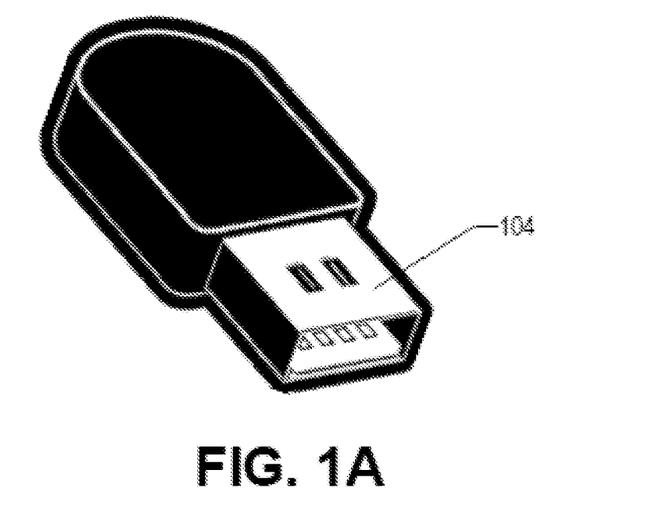
FIGS. 1A to 1C illustrate different aspects of an interface that provides both power and data communication between an electronic device and a power station.
Figure 1B:
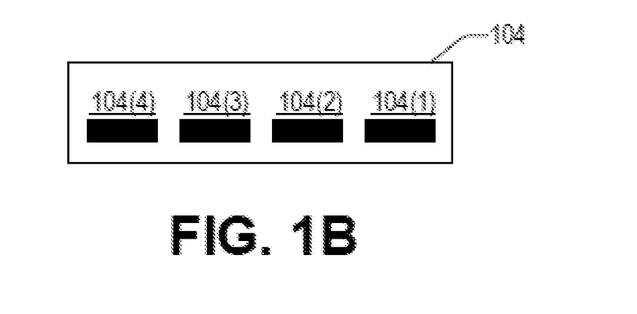
Figure 1C:
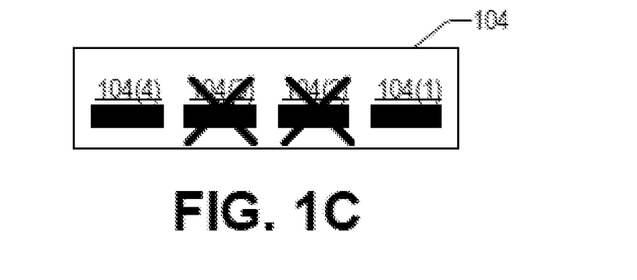

One solution includes to simply remove the data line of a charging interface. To that end, FIGS. 1A to 1C illustrate different aspects of an interface 104 that provides both power and data communication between an electronic device and a power station. By way of example only, and not by way of limitation, FIG. 1A illustrates a Universal Serial Bus type A (USB). FIG. 1B illustrates pins 104(1) to 104(4) of the interface 104. For example, pin 104(1) may be a positive terminal and pin 104(4) may be a negative (or ground) terminal of the voltage supply (e.g., 5V). Pins 104(2) and 104(3) may be data pins. Accordingly, by deactivating pins 104(2) and 104(3) (crossed over) as illustrated in FIG. 1C, data communication between an electronic device and a power station can be prevented. However, desirable functionality in a non-predatory situation, such as providing a quick charging interface and legitimate data communication related to charging, such as providing charge status information, communication authorization, etc., is prevented. In this regard, applicants have identified that by filtering the information in data lines (e.g., 104(2) and 104(3)) via low pass filters, data security concerns are substantially reduced.

Example Architecture

Figure 2:
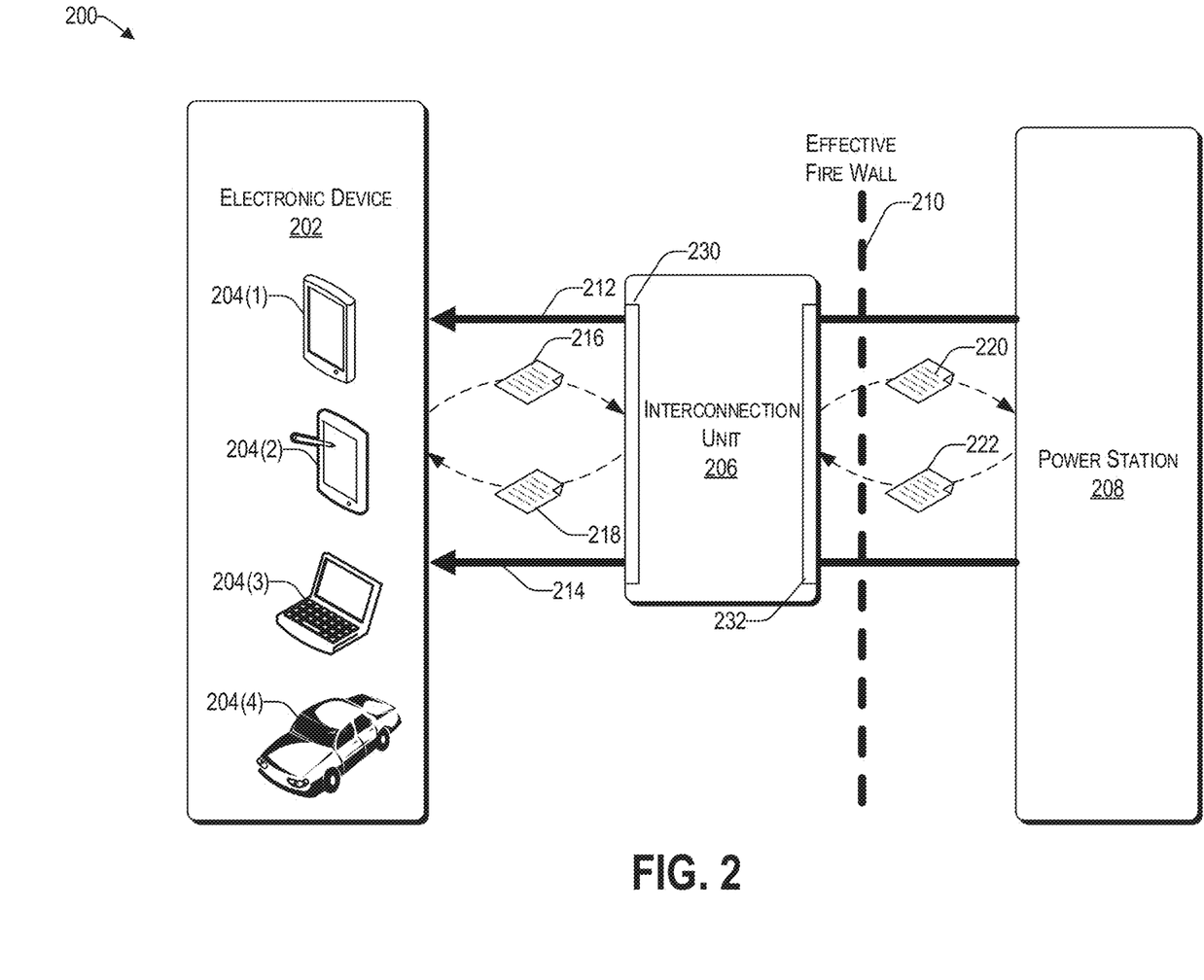
FIG. 2 illustrates an example architecture for providing a secure connection between an electronic device and a power station.

FIG. 2 illustrates an example architecture 200 for providing a secure connection between an electronic device 202 and a power station 208. For purposes of later discussion, several electronic devices appear in the drawing, to represent some examples of the devices that may be coupled to a power station via an interconnection unit 206. These electronic devices 204(1) to 204(4) are provided by way of example only, and not by way of limitation.

The interconnection unit 206 has a first connector 230 configured to be coupled to the electronic device 202. There is a second connector 232 configured to be coupled to a power station 208 and to provide a path to the electronic device 202 via the first connector 230. The first connector 230 is configured to allow power lines, such as 212 and 214 from the power station 208, to be coupled to the electronic device 202 for powering and/or charging the same. The first connector 230 is also configured to provide communication to one or more data lines (e.g., 216 and 218) of the electronic device 202. In various embodiments, one or more data lines (e.g., 216) may be configured to receive information from the electronic device 202, other data lines (e.g., 218) may be configured to send information to the electronic device 202, some data lines may be configured to transmit and receive information, or any combination thereof.

Similarly, the interconnection unit 206 has a second connector 232 that is configured to provide communication to one or more data lines (e.g., 220 and 222) of the power station 208. In various embodiments, one or more data lines (e.g., 222) may be configured to receive information from the power station, other data lines (e.g., 220) may be configured to send information to the power station 208, some data lines may be configured to transmit and receive information, or any combination thereof. In some embodiments, the data pins of the first connector and the second connector provide differential signaling communication.

In one embodiment, the configuration of the first connector 230 is substantially similar to that of the second connector 232, in that there are the same number of data and power pins. Further, the same I/O functionality between the data pins may be provided.

For each data line, the interconnection unit has at least one low pass filter coupled thereto. As used herein, a low-pass filter is a filter that passes signals with a frequency lower than a predetermined cutoff frequency and attenuates signals with frequencies higher than the cutoff frequency. It will be understood that the actual frequency response of the filter depends on the filter design. In various embodiments, a first-order filter, a second-order filter, or higher, may be used to provide an appropriate frequency response. The higher the order of the filter used, the sharper the decline at the cutoff frequency. In various embodiments, the low pass filter may be implemented via an RC filter, LC filter, or RLC filter. Both active and passive low-pass filters are within the scope of the present principles.

Accordingly, data that is communicated above a predetermined frequency cannot be exchanged between the electronic device 202 and the power station. In this regard, applicants have identified that malicious activity typically operates at data rates that is above a predetermined threshold. Stated differently, communication that is below a predetermined threshold data rate is ineffective to allow serious data loss and/or provide exposure to malware. That is because the introduction of the malware via the power station 208 and/or extraction of sensitive information, may take longer than an expected time that the electronic device is coupled to the power station 208 (e.g., charge cycle), thereby rendering a malicious attack ineffective. In this way, the interconnection unit 206 creates an effective fire wall 210 that protects the electronic device 202 from potential malicious activity from the power station 208. Thus, the interconnection unit 206 allows the electronic device 202 to be coupled to the power station, while maintaining data security of the electronic device 202.

Figure 3:
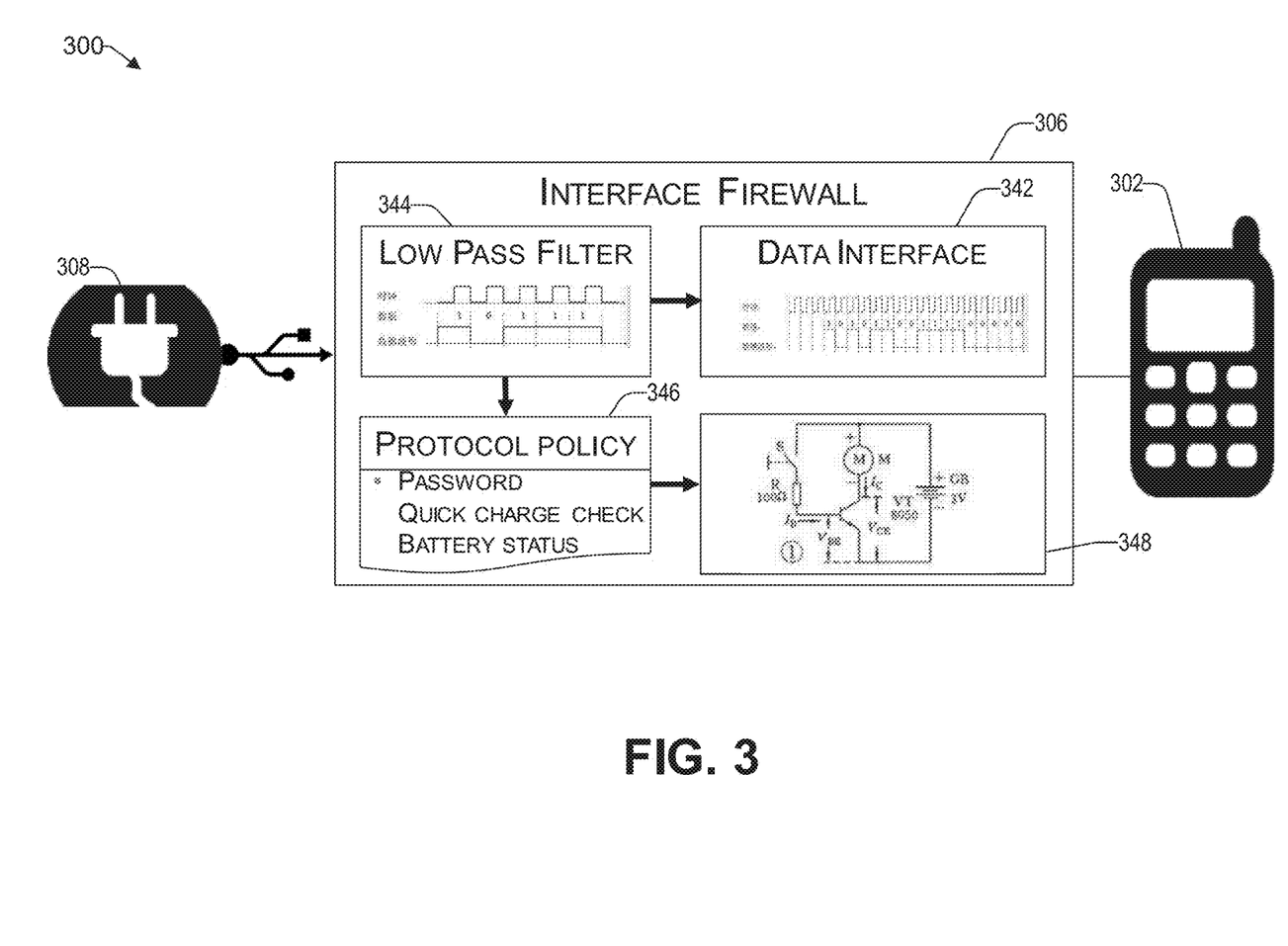
FIG. 3 is a block diagram of an interconnection unit coupled between an electronic device and a power station.

Reference now is made to FIG. 3, which is a block diagram of an interconnection unit 306 coupled between an electronic device 302 and a power station 308. The interconnection unit 306 effectively acts as an interface firewall 306 with respect to the power station 308, thereby protecting the digital data of the electronic device 302. The interconnection unit may include various blocks, such as a low pass filter 344, a data interface 342, a protocol policy 346, and low pass filter disabler 348.

The low pass filter block 344 includes one or more filters for each data line. As discussed previously, the block 344 passes signals with a frequency lower than a predetermined cutoff frequency and attenuates signals with frequencies higher than the cutoff frequency. Thus, high speed communication between the electronic device 302 and the power station 308 are prevented, when one or more filters of the low pass filter block 344 are active. For example, the data interface 342 may have a first connector coupled to the electronic device 302 and a second connector coupled to the power station 308. The data that is communicated between the electronic device 302 and the power station 308 via the data interface 342, is controlled by the low pass filter 344, such that communication that is at a frequency that is above the cut-off frequency of the low pass filter 344, is prevented.

In one embodiment, the interconnection unit 306 supports one or more protocol policies. To that end, the interconnection unit 306 may include a controller (not shown) that is configured to control one or more blocks discussed herein. For example, the protocol policy block 346 of the interconnection unit 306 can receive a request for a password from the power station 308, and provide the password on a user interface (e.g., display, speaker, etc.,) of the electronic device 302. Upon receiving the password via the electronic device 302, the interconnection unit 306 can provide the password to the power station 308 (e.g., to initiate the power station 308 to transfer power to the electronic device 302).

In one embodiment, the protocol policy block 346 of the interconnection unit 306 is operative to support various charging protocols, including quick charge (QC) protocols. Today, there are various quick charge protocols that are offered for different electronic devices. A goal of QC technology is to charge a battery of the electronic device as fast as it is chemical components can safely support it. To that end, there are various quick charge protocols, such as QC1.0, QC2.0, QC3.0, OPPO Voltage Open Loop Multi-Step Constant-Current Charging (VOOC), etc. For example, in contrast to the QC protocols from Qualcomm, where the voltage is increased during fast charging, VOOC uses a higher current than normal USB 2.0 charging. By adhering to the appropriate protocol, the electronic device can be charged more quickly, at a lower temperature, and more safely (e.g., preventing damage to the electronic device).

For example, by virtue of using a low pass filter (i.e., instead of blocking communication from all data lines), the quick charge protocol can be communicated between the electronic device 302 and the power station 308. In one embodiment, upon determining that a quick charge protocol is being communicated, the low pass filter for the relevant communication line (or for the entire low pass filter block 344) is turned OFF, thereby allowing high speed communication between the electronic device 302 and the power station 308 for the purpose of negotiating the appropriate quick charge protocol. Upon determining that the data communication related to the quick charge protocol is complete, the low pass filter is turned back ON to protect the data of the electronic device 302.

Similarly, applicants have identified that communication between the electronic device 302 and the power station 308, which is related to the status of the battery (e.g., level of charge, charge state, temperature, etc.,) can generally be communicated while the low pass filter is ON due to the low bandwidth requirements. In one embodiment, upon determining that the status of the battery is being provided by the electronic device 302 or requested by the power station 308, the protocol policy block 346 of the interconnection unit 306 turns OFF the low pass filter. In this way, a more detailed communication between the electronic device 302 and the power station 308, that is limited to the battery status, is made possible.

As discussed above, in some scenarios, the interconnection unit 306 can enable and disable one or more low pass filters of the low pass filter block 344. To that end, in one embodiment, there is a low pass filter disabler block 348 that is configured to turn ON/OFF the filter in a first direction (e.g., towards the electronic device) in a second direction (e.g., towards the power station 308), or in both directions. In various embodiments, the directional control of the low pass filter disabler block may be based on a level of security indicated by the electronic device (e.g., during an initial setup or interactively), or preprogrammed into the interconnection unit. Accordingly, in various scenarios, the low pass filtration may be turned OFF, bidirectional, or unidirectional.

Circulator Implementation

Figure 4:
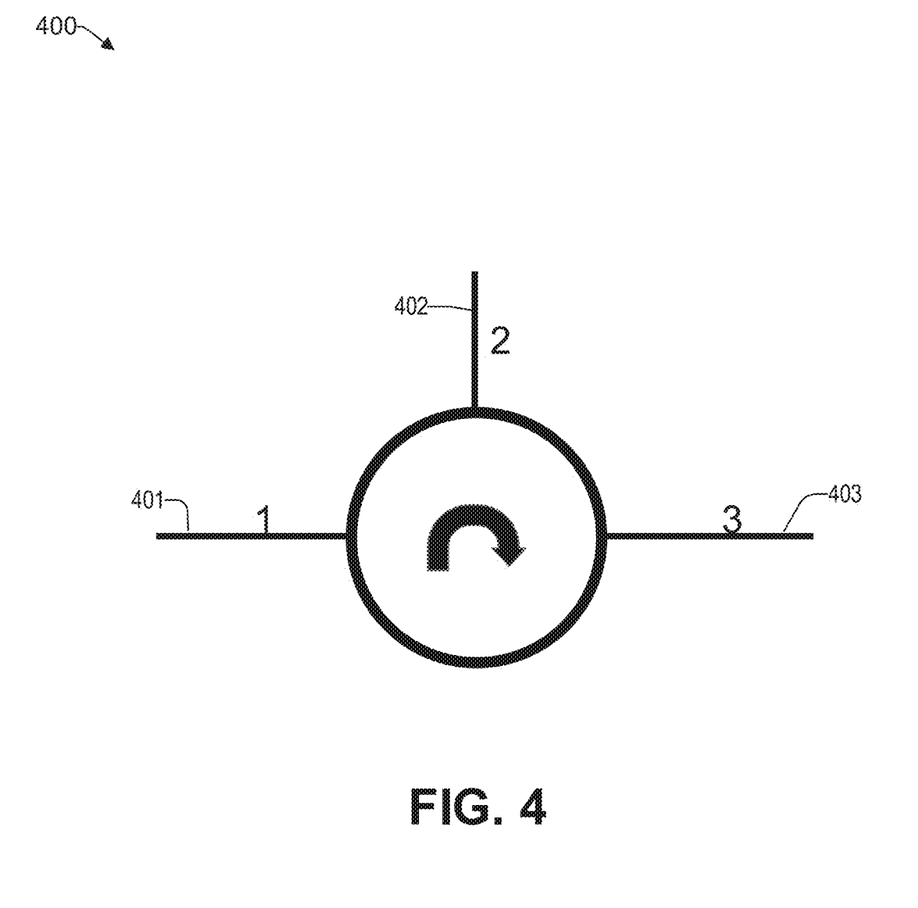
FIG. 4 illustrates a circulator configured to change an order between a first connector and a second connector.

In one embodiment, the ports of the interconnection unit 306, sometimes referred to herein as the pins of the first connector and the second connector, go through a circulator. To that end, FIG. 4 illustrates a circulator 400, configured to change the order between the first connector 230 and the second connector 232 of FIG. 2. The circulator 400 is a passive non-reciprocal multi-port device, in which a signal entering any port is transmitted to the next port in rotation (e.g., port 1 (501) of the first connector 230, to port 2 (502) of the second connector 232). As used herein, a port is a point where an external signal connects to the electronic device 202.

Thus, for the example three-port circulator 400 of FIG. 4, a signal applied to port 1 (501) comes out of port 2 (502); a signal applied to port 2 (502) comes out of port 3 (503); a signal applied to port 3 (503) comes out of port 1 (501). For example, in some communication lines, the same cable is shared to send and receive data. If it is desired to control send and receive independently, the two signals are decomposed to different lines. By virtue of the circulator 400, bidirectional signals can be merged and decomposed. Accordingly, sending and receiving can be independently controlled.

Figure 5:
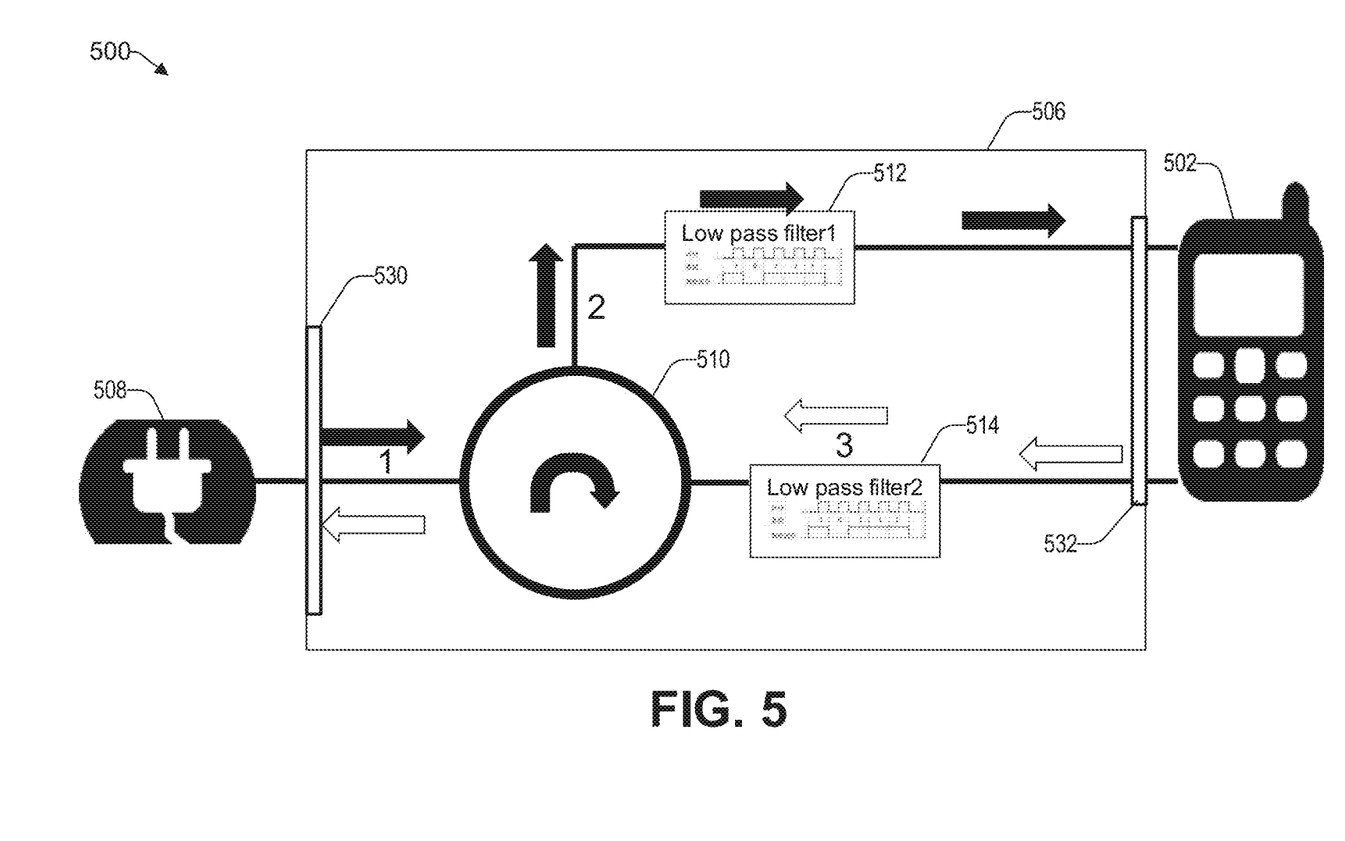
FIG. 5 is a block diagram of an interconnection unit having a circulator used between an electronic device and a power station, consistent with an illustrative embodiment.

FIG. 5 is a block diagram 500 of an interconnection unit 506 having a circulator 510 used between an electronic device 502 and a power station 508, consistent with an illustrative embodiment. The circulator 510 is coupled between a first connector 530 coupled to the power station 508 and a second connector 532 coupled to the electronic device 502. For example, if the electronic device 502 would like to send a signal to the power station 508, the path includes the second low pass filter 514, port 3, of the circulator 510, and ultimately the power station 508. Accordingly, the electronic device 502 cannot transmit high speed signals via port 3 if the second low pass filter 514 is enabled.

Similarly, if the power station 508 would like to send a signal to the electronic device 502, the path includes ports 1 and 2 of the circulator 510, the first low pass filter 512, and ultimately the electronic device 502. If the first low pass filter 512 is enabled, then the electronic device 502 cannot receive high speed signals via port 2 of the circulator 510.

Example Electronic Device

Figure 6:
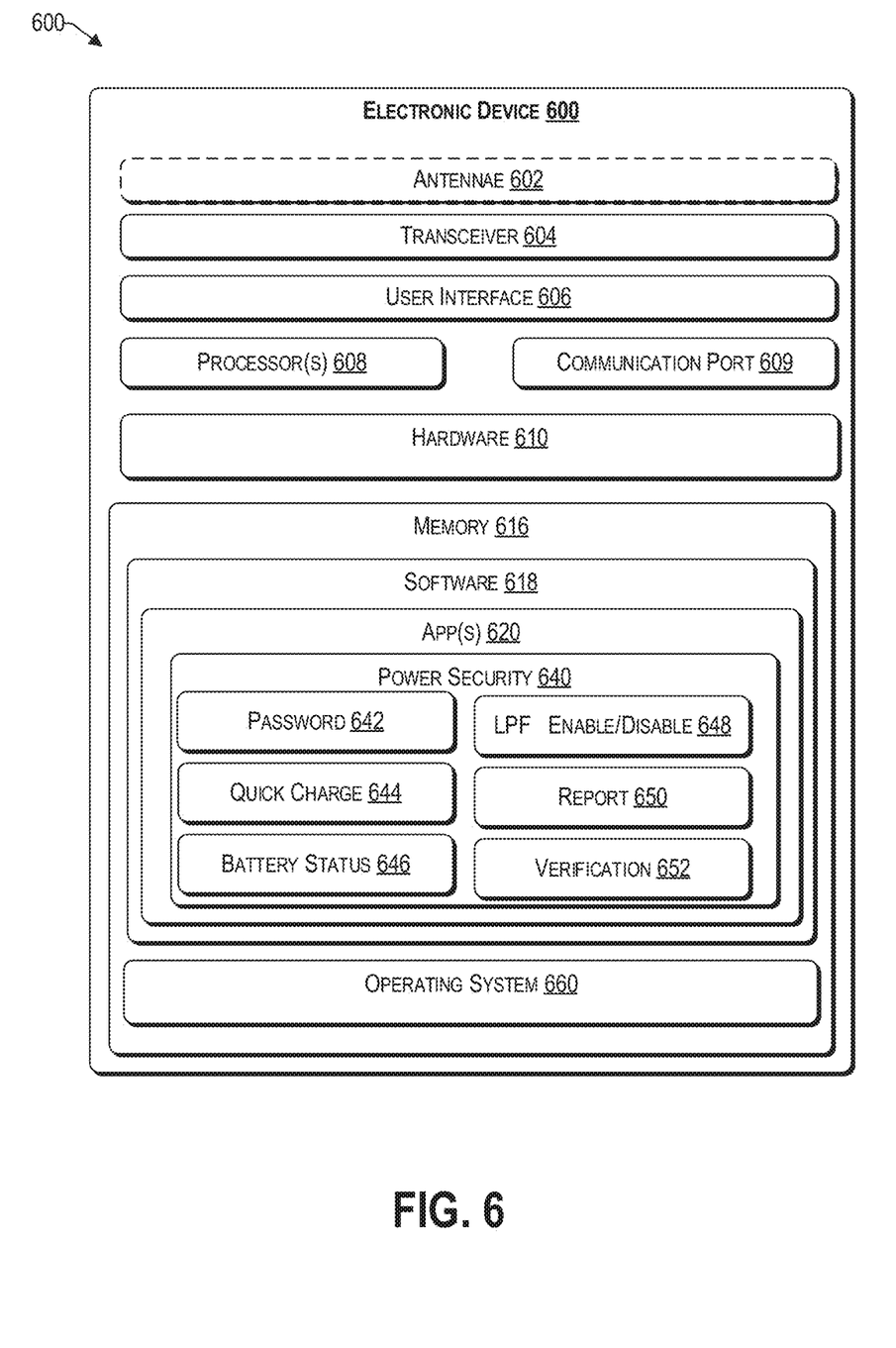
FIG. 6 is a block diagram showing various components of an illustrative electronic device at a high level, which includes at least part of the functionality of the interconnection unit of FIG. 2.

As discussed in the context of FIG. 1, the interconnection unit may be coupled to, or be part of, different types of electronic devices. To that end, FIG. 6 illustrates a block diagram showing various components of an illustrative electronic device 600 at a high level, which includes at least part of the functionality of the interconnection unit discussed in the context of FIG. 2. For discussion purposes, the illustration shows the electronic device 600 in the form of a wireless computing device.

The electronic device 600 may include one or more antennae 602; a transceiver 604 for cellular, Wi-Fi communication, and/or wired communication; a user interface 606; one or more processors 608; a wired communication port 609; hardware 610; and memory 616. In some embodiments, the antennae 602 may include an uplink antenna that sends radio signals to a base station, and a downlink antenna that receives radio signals from the base station. In some other embodiments, a single antenna may both send and receive radio signals. The same or other antennas may be used for Wi-Fi communication. These signals may be processed by the transceiver 604, sometimes collectively referred to as a network interface, which is configured to receive and transmit digital data. In one embodiment, the electronic device 600 does not include an antenna 602 and communication with external components is via wired communication, e.g., via a port, such as USB-A, USB-B, USB-C, micro-USB, lightning, etc., represented by communication port 609.

In one embodiment, the electronic device 600 includes a user interface 606 that enables a user to provide input and receive output from the electronic device 600. For example, the user interface 606 may include a data output device (e.g., visual display, audio speakers, haptic device, etc.,) that may be used to provide notifications from a power station it is coupled to.

The user interface 606 may also include one or more data input devices. The data input devices may include, but are not limited to, combinations of one or more of keypads, keyboards, mouse devices, touch screens, microphones, speech recognition packages, and any other suitable devices or other electronic/software selection interfaces. For example, the data input devices may be used to respond to inquiries from a power station 208 or an app in the memory 610 of the electronic device.

The electronic device 600 may include one or more processors 608, which may be a single-core processor, a multi-core processor, a complex instruction set computing (CISC) processor, or another type of processor.

The hardware 610 may include a power source and digital signal processors (DSPs), which may include single-core or multiple-core processors. The hardware 610 may also include network processors that manage high-speed communication interfaces, including communication interfaces that interact with peripheral components. The network processors and the peripheral components may be linked by switching fabric. The hardware 610 may further include hardware decoders and encoders, a network interface controller, and/or a communication port controller. The hardware 610 includes one or more low pass filters that are operative to filter communication that is performed at a high data rate, as discussed herein. The hardware 610 may also include one or more low pass filter enable/disable circuits configured to control the ON/OFF state of the low pass filters.

The memory 616 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 616 may store various software components or modules that are executable or accessible by the processor(s) 608 and controller(s) of the electronic device 600. The various components of the memory 616 may include software 618 and an operating system 650. The software 618 may include various applications 620, such as a power security application 640 operative to provide at least some of the functions of the interconnection unit 206 discussed in the context of FIG. 2. The Power security 640 application may have several modules that may include routines, program instructions, objects, and/or data structures that perform tasks or implement abstract data types.

For example, the power security application 640 of the electronic device 600 may include a password module 642 that is operative to receive a password via a user interface 606 and provide it to the power station 208. There may be a quick charge module 644 operative to negotiate various charging protocols between the electronic device 600 and the power station, as discussed herein. There may be a battery status module 646 operative to identify various conditions of the battery, such as level of charge, charge state, temperature, power demand, etc., and communicate the same to the power station 208. There may be a report module 650 operative to provide power and/or charge status information on a user interface 606 of the electronic device 600. Status information may include whether power station coupled to the electronic device is trusted.

The power security application 640 may further include a verification module 652 operative to determine whether the power station is trusted. In various embodiments, whether a power station is trusted can be determined via reference to stored information in the memory 616, which identifies the power station as a trusted device, or via a prompt on the user interface 606 to solicit whether the power station coupled thereto can be trusted. In some embodiments, the user of the electronic device 600 can select a level of trust and/or the direction of the filtration that should be implemented. There may be a low pass filter enable/disable module operative to send signals to the LPF enable/disable circuit(s) of the hardware. The password 642, quick charge 644, and battery status 646 modules may cooperate with the LPF enable/disable module 648 to turn OFF the relevant low pass filter(s) when additional bandwidth would benefit the password, quick charge, and battery task, respectively.

The operating system 660 may include components that enable the electronic device 600 to receive and transmit data via various interfaces (e.g., user controls, communication interface, and/or memory input/output devices), as well as process data using the processor(s) 608 to generate output. The operating system 660 may include a presentation component that presents the output (e.g., display the data on an electronic display of the electronic device 600, store the data in memory 616, transmit the data to another electronic device, etc.). Additionally, the operating system 660 may include other components that perform various additional functions generally associated with an operating system 660.

Example Process

Figure 7:
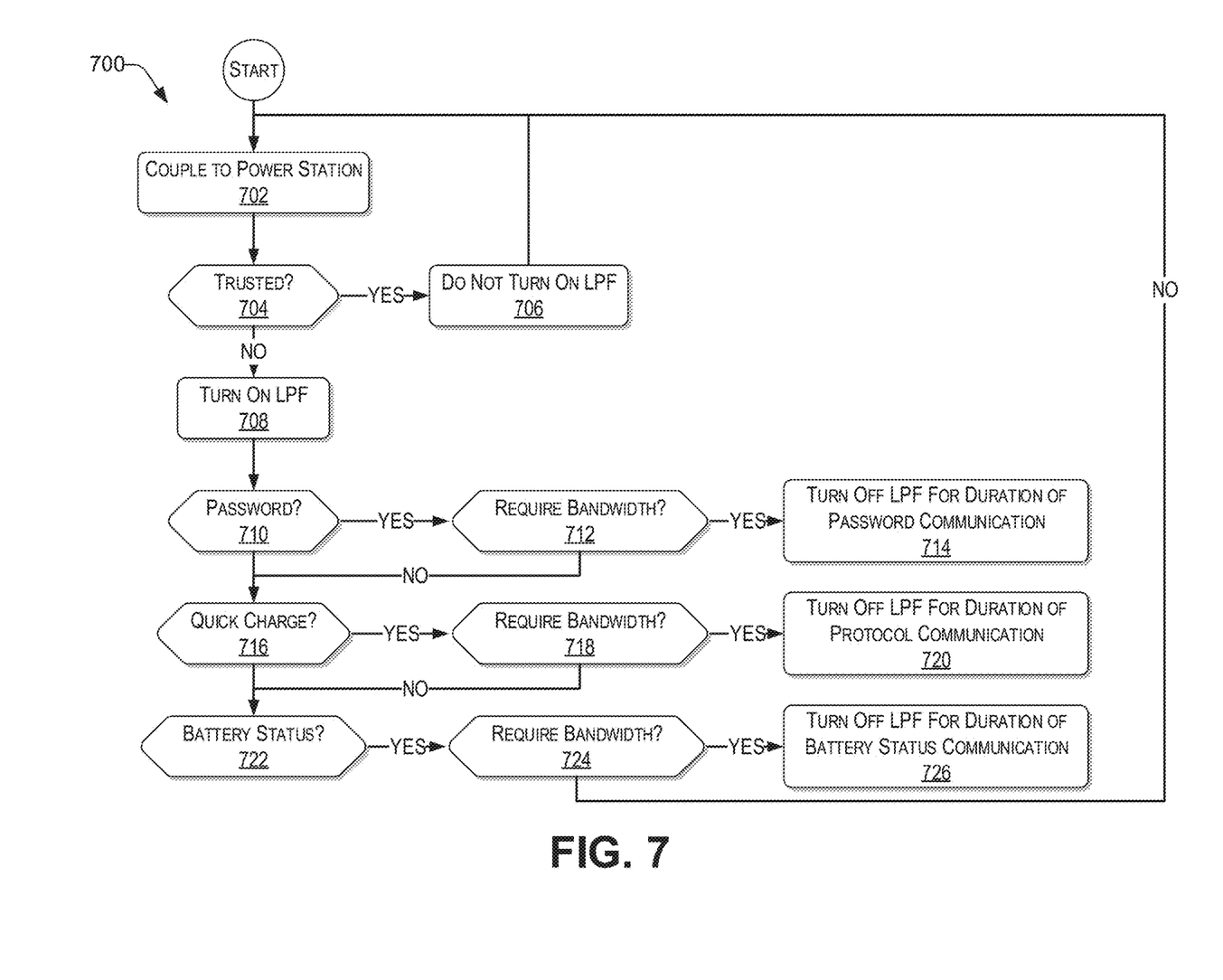
FIG. 7 presents an illustrative process for safely providing power to an electronic device without compromising the data stored therein.

With the foregoing overview of the example architecture 200 and example electronic device 600, it may be helpful now to consider a high-level discussion of an example process. To that end, FIG. 7 presents an illustrative process 700 for safely providing power to an electronic device without compromising the data stored therein. Process 700 is illustrated as a collection of blocks in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described blocks can be combined in any order and/or performed in parallel to implement the process. For discussion purposes, the process 700 is described with reference to the architecture 200 of FIG. 2.

At block 702, an electronic device 202 is coupled to a power station 208. In various embodiments, the connection may be via an interconnection unit 206 that is outside of the electronic device 202 or via similar functionality provided within the electronic device 202 (i.e., without an external interconnection unit 206). For simplicity, the discussion herein will refer to an external interconnection unit 206, while it will be understood that similar functionality can be provided with an appropriately configured electronic device that includes at least some of the functions of the interconnection unit 206, as discussed in the context of FIG. 6.

At block 704, the interconnection unit 206 determines whether the power station 208 is a trusted device. In various embodiments, whether a power station can be trusted can be determined by soliciting a user operating the electronic device via a user interface, or by referring to a reference table stored in a memory of the electronic device that identifies the electronic device to be a trusted device. To that end, upon coupling with the power station 208, the power station 208 can provide an identification code. If the power station 208 can be trusted (i.e., "YES" at decision block 704), the process continues with block 706, where the low pass filter is not turned ON. However, upon determining that the power station 208 cannot be trusted (i.e., "NO" at decision block 704), the process continues with block 708, where the low pass filter is turned ON.

In various embodiments, the low pass filter can be turned ON in a first direction (e.g., towards the electronic device 202) in a second direction (e.g., towards the power station 208), or in both directions, based on interactive or predetermined settings of the interconnection unit 206 with respect to the power station 208.

At block 710, the interconnection unit 206 determines whether data communication between the electronic device 202 and the power station 208 relates to authentication. In a non-limiting example, the credentials may include a username, password, and/or other biometric identifier associated with a user subscribed to the power station 208 service and/or electronic device 202. If so (i.e., "YES" at decision block 710), it is determined whether such authentication involves more bandwidth than is provided with the low pass filter. If so, (i.e., "YES" at decision block 712), the process continues with block 714, where the low pass filter is turned OFF for the duration of the communication that relates to the authentication. If not, (i.e., "NO" at decision block 712), the communication is allowed to continue via low pass filtration.

At block 716, the interconnection unit 206 determines whether data communication between the electronic device 202 and the power station 208 relates to a quick charge protocol. If so (i.e., "YES" at decision block 716), at block 718, it is determined whether such protocol involves more bandwidth than is provided with the low pass filter. If so, (i.e., "YES" at decision block 718), the process continues with block 720, where the low pass filter is turned OFF for the duration of the communication that relates to the quick charge protocol. If not, (i.e., "NO" at decision block 718), the communication of the quick charge protocol is allowed to continue via low pass filtration.

At block 722, the interconnection unit 206 determines whether data communication between the electronic device 202 and the power station 208 relates to its battery status. If so (i.e., "YES" at decision block 722), at block 724, it is determined whether reporting the battery status involves more bandwidth than is provided with the low pass filter. If so, (i.e., "YES" at decision block 724), the process continues with block 726, where the low pass filter is turned OFF for the duration of the communication that relates to the quick charge protocol. If not, (i.e., "NO" at decision block 724), the communication of the battery status is allowed to continue via low pass filtration.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An interconnection unit, comprising:
a first connector configured to be coupled to an electronic device;
a second connector configured to be coupled to a power station and to provide a path to the electronic device via the first connector;
a low pass filter coupled between the first connector and the second connector and configured to allow the electronic device to receive power from the power station while maintaining data security of the electronic device, wherein the low pass filter is configured to allow data communication related to charging to pass through the data lines, while blocking data communication above a cutoff frequency of the low pass filter; and
an enable circuit configured to turn ON/OFF the low pass filter, wherein the enable circuit is configured to:
turn OFF the low pass filter upon determining that a quick charge protocol or a status of a battery is being communicated; and
turn ON the low pass filter upon determining that the quick charge protocol or the status of the battery communication has completed.

2. The interconnection unit of claim 1, wherein the first and second connectors each include at least one power pin and at least one data pin.

3. The interconnection unit of claim 2, wherein the low pass filter is coupled between a data pin of the first connector and a data pin of the second connector.

4. The interconnection unit of claim 1, wherein the low pass filter is unidirectional and configured to filter data communication that is above a cutoff frequency of the low pass filter, from the electronic device to the power station.

5. The interconnection unit of claim 1, wherein the low pass filter is unidirectional and configured to filter data communication that is above a cutoff frequency of the low pass filter, from the power station to the electronic device.

6. The interconnection unit of claim 1, further comprising a policy unit configured to:
transmit a request for a password from the power supply to the electronic device;
receive a password from the electronic device in response to the request; and
provide the password to the power supply.

7. The interconnection unit of claim 1, further comprising a policy block, wherein the policy block is configured to, upon determining that a data communication between the electronic device and the power station relates to password access to the power station, deactivating the low pass filter for a duration of the data communication related to the password access to the power station.

8. The interconnection unit of claim 1, wherein the interconnection unit is configured to support one or more quick charge protocols while data communication between the power station and the electronic device is low pass filtered via the low pass filter.

9. The interconnection unit of claim 1, further comprising a policy block, wherein the policy block is configured to: upon determining that a data communication between the electronic device and the power station relates to a quick charge protocol, deactivating the low pass filter for a duration of the quick charge protocol communication.

10. The interconnection unit of claim 1, further comprising a policy block, wherein the policy block is configured to: upon determining that a data communication between the electronic device and the power station relates to a status of a battery, deactivating the low pass filter for a duration of the battery status communication.

11. The interconnection unit of claim 1, further comprising a circulator circuit configured to change an order of pins between the first connector and the second connector.

12. The interconnection unit of claim 1, wherein:
the first connector is at least one of:
a Universal Serial Bus (USB) type A plug;
a USB type B plug;
a USB type C plug; and
a lightning plug; and
the second connector is at least one of:
a Universal Serial Bus (USB) type A plug;
a USB type B plug;
a USB type C plug; and
a lightning plug.

13. An electronic device, comprising:
a connector configured to be coupled to a power station;
a low pass filter coupled to the connector and configured to allow the electronic device to receive power from the power station while maintaining data security of the electronic device, wherein the low pass filter is configured to allow data communication related to charging to pass through the data lines, while blocking data communication above a cutoff frequency of the low pass filter, and
an enable circuit configured to turn ON/OFF the low pass filter, wherein the enable circuit is configured to:
turn OFF the low pass filter upon determining that a quick charge protocol or a status of a battery is being communicated; and
turn ON the low pass filter upon determining that the quick charge protocol or the status of the battery communication has completed.

14. The electronic device of claim 13, wherein the low pass filter is unidirectional and configured to filter data communication that is above a cutoff frequency of the low pass filter, from the electronic device to the power station.

15. The electronic device of claim 13, wherein the low pass filter is unidirectional and configured to filter data communication that is above a cutoff frequency of the low pass filter, from the power station to the electronic device.

16. The electronic device of claim 13, further comprising a policy unit configured to:
receive a request for a password from the power supply;
receive a password from a user interface of the electronic device in response to the request; and
provide the password to the power supply.

17. The electronic device of claim 13, further comprising a policy block, wherein the policy block is configured to, upon determining that a data communication between the electronic device and the power station relates to password access to the power station, deactivating the low pass filter for a duration of the data communication related to the password access to the power station.

18. The electronic device of claim 13, wherein the interconnection unit is configured to support one or more quick charge protocols while data communication between the power station and the electronic device is low pass filtered via the low pass filter.

19. The electronic device of claim 13, further comprising a policy block, wherein the policy block is configured to: upon determining that a data communication between the electronic device and the power station relates to a quick charge protocol, deactivating the low pass filter for a duration of the quick charge protocol communication.

* * * * *